(12) United States Patent
Baeuerle et al.

(10) Patent No.: US 6,216,067 B1
(45) Date of Patent: Apr. 10, 2001

(54) METHOD AND DEVICE FOR GENERATING AN ERROR SIGNAL IN A MOTOR VEHICLE

(75) Inventors: Michael Baeuerle, Markgroeningen; Klaus Ries-Mueller, Bad Rappenau, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/463,727
(22) PCT Filed: Mar. 26, 1999
(86) PCT No.: PCT/DE99/00912
  § 371 Date: Jun. 30, 2000
  § 102(e) Date: Jun. 30, 2000
(87) PCT Pub. No.: WO99/50094
  PCT Pub. Date: Oct. 7, 1999

(30) Foreign Application Priority Data

Apr. 1, 1998 (DE) .............................. 198 14 482

(51) Int. Cl.$^7$ .................................................. B60R 16/02
(52) U.S. Cl. ................................ 701/29; 701/76; 701/83; 303/122
(58) Field of Search ...................... 701/29, 35, 76, 701/65, 84, 83, 90, 91; 477/107, 115; 303/122, 122.09, 122.11

(56) References Cited

U.S. PATENT DOCUMENTS 5,478,293 * 12/1995 Yonezawa ............................ 477/110
5,542,756 * 8/1996 Luckevich et al. ............. 303/122.11

FOREIGN PATENT DOCUMENTS

4339570 * 5/1995 (DE).
19510522 * 9/1996 (DE).
19510525 * 9/1996 (DE).

* cited by examiner

Primary Examiner—Tan Nguyen
(74) Attorney, Agent, or Firm—Kenyon & Kenyon

(57) ABSTRACT

A method and a device for generating an error signal in a motor vehicle. In this context, the vehicle has a drive engine as well as an actuating arrangement which can be actuated by the driver of the vehicle, and with the assistance of which a braking system is activated. Further, a detecting arrangement detects an actuation of the actuation arrangement. A wheel drag torque quantity is determined which represents the drag torque caused by the engine at the vehicle wheels. Moreover, a deceleration quantity is determined which represents the longitudinal deceleration of the vehicle. Furthermore, a braking quantity is determined which represents the operating state of the actuating arrangement. The error signal is then generated as a function of the determined drag torque quantity, the determined deceleration quantity, and the determined braking quantity. Thus, it is possible to perform diagnostics on the safety-relevant brake lights switch without requiring additional outlay for hardware.

9 Claims, 2 Drawing Sheets

METHOD AND DEVICE FOR GENERATING AN ERROR SIGNAL IN A MOTOR VEHICLE

BACKGROUND INVENTION

The present invention relate to method and a device for generating an error signal in a motor vehicle respectively.

In modern vehicles, the brake lamps are generally controlled as a function of a brake pedal actuation. To this end, a brake lights switch is activated by the brake pedal operated by the driver. The position of this switch signals a brake actuation, and, apart from the brake light control, can also be utilized, for example, for controlling the engine and/or the transmission. A defect in such a brake lights switch must be detected as quickly and as reliably as possible, since a defective brake lights switch can signify that different vehicle functions are not being properly executed.

SUMMARY OF THE INVENTION

An object of the present invention is to generate an error signal in a simple manner which will indicate a defect in such a brake lights switch.

As mentioned before, the present invention starts out from a method and a device for generating an error signal in a motor vehicle. In this context, the vehicle has a drive engine, as well as an actuating arrangement for activating a braking system. Further, a detecting arrangement are provided for recognizing an actuation of the actuating arrangement. According to the present invention a wheel drag torque quantity is determined which represents the drag torque produced by the engine at the vehicle wheels. Moreover, a deceleration quantity is ascertained which represents the vehicle's longitudinal deceleration. Also determined is a braking quantity which represents the operating state of the actuating arrangement. The error signal is then generated as a function of the determined drag torque quantity, the determined deceleration quantity, and of the determined braking quantity.

Thus, according to the present invention the monitoring of the brake lights switch is carried out on the basis of the interpretation of the longitudinal dynamics determined, for example, from the wheel speeds, the wheel drag torque determined, for example, with the assistance of the engine drag torque and the gear transmission ratio. The present invention enables diagnostics to be performed on the brake lights switch, which is relevant to safety, without requiring additional outlay for hardware.

In this context, as mentioned, the actuating arrangement can be designed as a brake pedal, and the detecting arrangement as a brake lights switch that is used to detect a brake pedal actuation.

It is particularly advantageous for the error signal to represent the proper or the improper condition of the detecting arrangement, and, furthermore, for an indicating arrangement to be provided which alter their operating state in response to the generated error signal.

One advantageous embodiment of the present invention provides for determining an engine drag torque quantity that represents the engine drag torque, and a gear transmission ratio quantity that represents the gear transmission ratio currently adjusted between the vehicle engine and the driven vehicle wheels. The wheel drag torque quantity is then determined as a function of the ascertained engine drag torque quantity and the ascertained gear transmission ratio quantity.

One particularly advantageous embodiment of the present invention provides for the error signal to represent the proper or the improper condition of the detecting arrangement, and for the determined deceleration quantity to be compared to a first predefinable threshold value, and for the determined wheel drag torque quantity to be compared to a second predefinable threshold value. The error signal is then generated long the lines of an improper condition if

- the determined deceleration quantity exceeds the first threshold value; and
- the determined wheel drag torque quantity falls below the second threshold value; and
- the determined braking quantity represents that operating state of the actuating arrangement in which no actuation of the actuating arrangement is detected.

To determine the deceleration quantity, preferably the wheel speeds of the vehicle wheels and/or the vehicle's longitudinal deceleration are detected.

To generate the error signal, it is also possible to consider a signal that represents the operating state of a clutch arranged in the power train of the vehicle. In particular, the error signal should only be generated when the clutch is closed.

DETAILED DESCRIPTION

Figure 1:
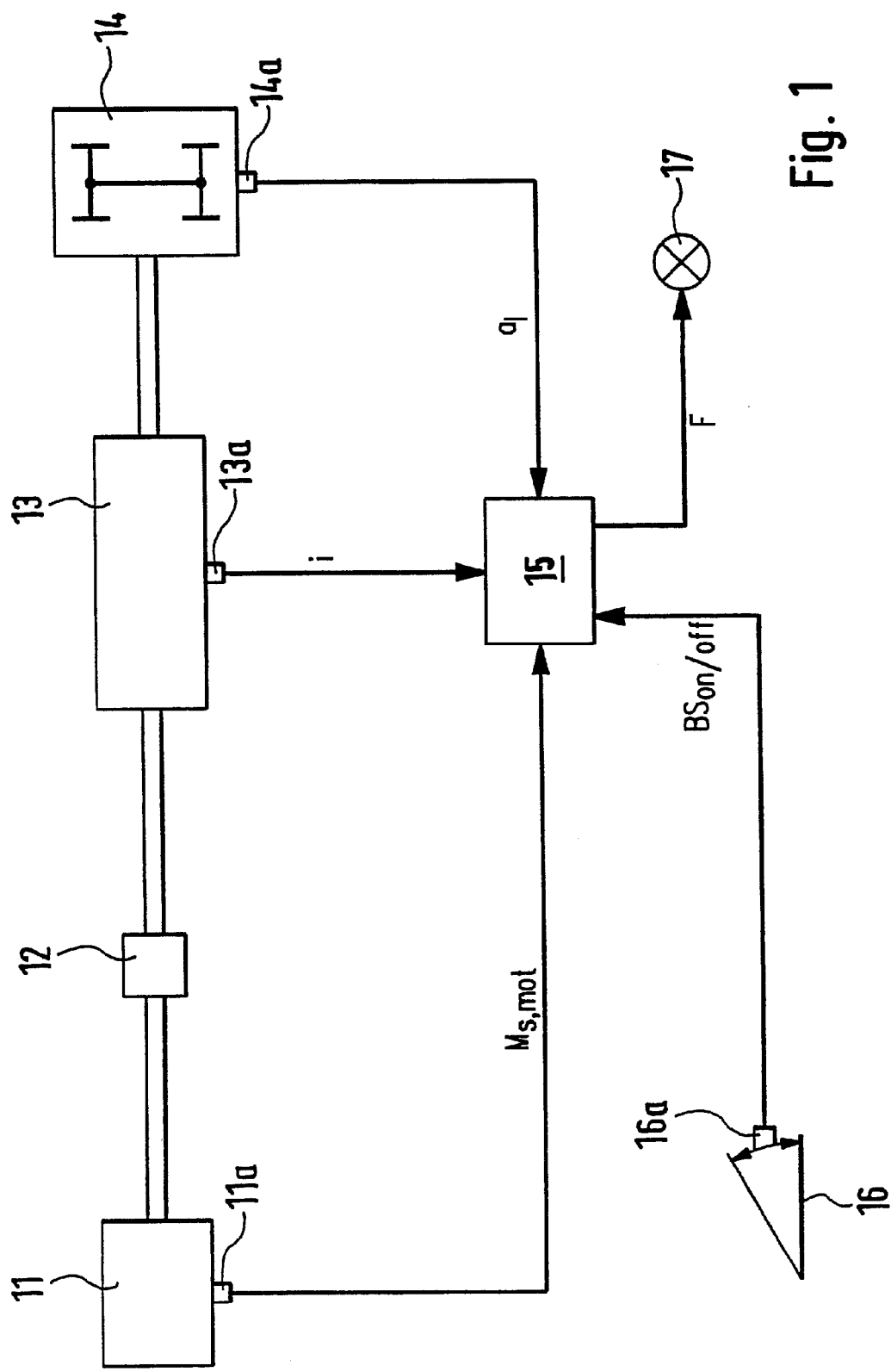
FIG. 1 shows a block diagram according to the present invention.

In FIG. 1, reference symbol 11 denotes a vehicle engine whose functions are controlled by engine control unit 11a in open or closed loop. The engine torque currently existing at the output end of engine 11, in particular engine drag torque $M_{s,mot}$, is present in engine control unit 11a, and is fed to control unit 15.

Engine 11 is connected to the drive wheels of vehicle 14 via a clutch and/or a torque converter 12 via transmission 13. The functions of the transmission are controlled by transmission control unit 13a in open or closed loop. Present in transmission control unit 13a is generally the currently adjusted gear transmission ratio i, which is fed to control unit 15.

Longitudinal acceleration $a_l$ of the vehicle is detected by sensor 14a and fed to the control unit.

The actuation of brake pedal 16, which can be actuated by the driver of the vehicle, is detected by brake lights switch 16a. The position ($BS_{on}$ or $BS_{off}$) of brake lights switch 16a is fed to control unit 15. Generally, the position ($BS_{on/off}$) of brake lights switch 16a, as a standard, is read in by modern engine control units. Control unit 15 generates error signal F, which is used to trigger an error light 17, as a function of the input signals. This will be explained in greater detail on the basis of FIG. 2.

In this context, the division shown in FIG. 1 between engine control unit 11a, transmission control unit 13a, and control unit 15 is selected merely for the sake of better clarity. However, functions of the mentioned individual control units can be executed in each of the other control units, as well. Thus, for example, control unit 15 and engine control unit 11a, in particular, can be combined into one unit. The gear transmission ratio can also be determined in the engine control unit or in the combined control unit, respectively, for example, with the assistance of a simple evaluation of the engine and transmission output speeds. The longitudinal acceleration can be determined, for example, on the basis of the transmission output speed or the wheel speeds, respectively, in a differentiating.

Figure 2:
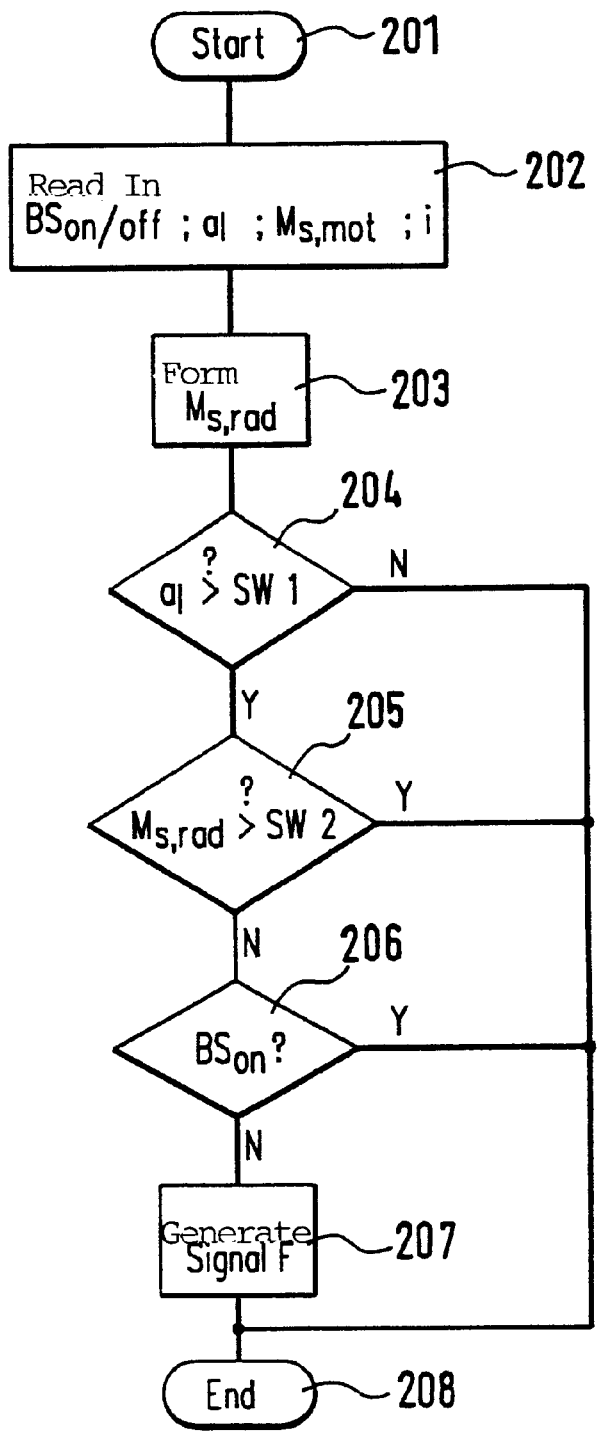
FIG. 2 shows a flow chart representing a process according to the present invention.

Subsequent to the starting step 201 shown in FIG. 2, the mentioned input signals, position $BS_{on/off}$, the vehicle's instantaneous longitudinal acceleration $a_l$, instantaneous engine drag torque $M_{s,mot}$, as well as the currently adjusted gear transmission ratio i are read in in a step 202. In step 203, wheel drag torque $M_{s,rad}$ acting at the drive wheels is generated from engine drag torque $M_{s,mot}$ and the gear transmission ratio.

The following can lead to a vehicle deceleration:
1. An ascending roadway (uphill) grade can lead to a vehicle deceleration due to overcome the difference in altitude.
2. Shifting, in particular shifting down, can lead to a vehicle deceleration.
3. If the driver of the vehicle uses the accelerator to reduce the engine torque, this can result in a longitudinal vehicle deceleration
4. A brake actuation leads to a vehicle deceleration.

According to the present invention, the position of brake lights switch 16a ($BS_{on/off}$) is compared to specific quantities for diagnostic purposes. In this context, one has to exclude the above mentioned cases 1 through 3, where a vehicle deceleration is not caused by a brake actuation.

One can distinguish between cases 1 through 4 through a comparison 204 of the engine or wheel acceleration al, respectively, with a threshold value SW1. In all probability, a substantial vehicle deceleration (query result "Y" in step 204) can only be caused by a braking intervention.

Cases 2 and 3 can be detected through a comparison 205 of the instantaneous wheel drag torque $M_{s,rad}$ with a threshold value SW2. If wheel drag torque $M_{s,rad}$ suffices (query result "Y" in step 205), then, in accordance with the present invention, error signal F should not be generated for safety reasons. However, if the vehicle's longitudinal deceleration is great enough, and the wheel drag torque $M_{s,rad}$ is low enough, then a brake actuation is present, and brake lights switch 16a emits signal $BS_{on}$. This is checked in step 206. If this is the case, one goes over directly to final step 208. However, if this is not the case, then brake lights switch 16a is defective, which is indicated by generation of error signal F via indicating arrangement 17.

Subsequent to final step 208, the sequence shown in FIG. 2 is started again.

What is claimed is:

1. A method for generating an error signal in a motor vehicle including a vehicle engine for driving the vehicle, an actuating arrangement capable of being actuated by a driver of the vehicle and for activating a braking system, and a detecting arrangement for detecting an actuation of the actuating arrangement, the method comprising the steps of:
   determining a wheel drag torque quantity representing a drag torque caused by the engine at wheels of the vehicle;
   determining a deceleration quantity representing a longitudinal deceleration of the vehicle;
   determining a braking quantity representing an operating state of the actuating arrangement; and
   generating the error signal as a function of the determined wheel drag torque quantity, the determined deceleration quantity, and the determined braking quantity.

2. The method according to claim 1, wherein:
   the actuating arrangement corresponds to a brake pedal, and
   the detecting arrangement corresponds to a brake lights switch.

3. The method according to claim 1, further comprising the step of:
   providing an indicating arrangement for changing an operating state in response to the generated error signal, wherein:
      the error signal represents one of a proper condition and an improper condition of the detecting arrangement.

4. The method according to claim 1, further comprising the steps of:
   determining an engine drag torque quantity representing an engine drag torque;
   determining a gear transmission ratio quantity representing a gear transmission ratio currently adjusted between the engine and the wheels of the vehicle that are driven; and
   determining the wheel drag torque quantity as a function of the determined engine drag torque quantity and the determined gear transmission ratio quantity.

5. The method according to claim 1, further comprising the steps of:
   comparing the determined deceleration quantity with a first predefinable threshold value;
   comparing the determined wheel drag torque quantity with a second predefinable threshold value; and
   generating the error signal if:
      the determined deceleration quantity exceeds the first threshold value,
      the determined wheel drag torque quantity falls below the second threshold value, and
      the determined braking quantity represents the operating state of the actuating arrangement in which no actuation of the actuating arrangement is detected,
      wherein the error signal represents one of a proper condition and an improper condition of the detecting arrangement.

6. The method according to claim 1, further comprising the step of:
   detecting at least one of wheel speeds of the wheels of the vehicle and a longitudinal acceleration of the vehicle in order to determine the deceleration quantity.

7. The method according to claim 1, further comprising the step of:
   considering a signal representing an operating state of a clutch arranged in a power train of the vehicle in order to generate the error signal.

8. A device for generating an error signal in a motor vehicle including a vehicle engine for driving the vehicle, an actuating arrangement capable of being actuated by a driver of the vehicle and for activating a braking system, and a detecting arrangement for detecting an actuation of the actuating arrangement, comprising:
   an arrangement for determining a wheel drag torque quantity representing a drag torque caused by the engine at wheels of the vehicle;
   an arrangement for determining a deceleration quantity representing a longitudinal deceleration of the vehicle;
   an arrangement for determining a braking quantity representing an operating state of the actuating arrangement; and
   an arrangement for generating the error signal as a function of the determined wheel drag torque quantity, the determined deceleration quantity, and the determined braking quantity.

9. The device according to claim 8, further comprising:
   an engine control unit for controlling the engine according to one of an open loop and a closed loop as a function of data present in the control unit.

* * * * *